Nov. 23, 1971  E. S. WOODHALL  3,621,522
POLYURETHANE FOAM APPARATUS
Filed June 16, 1969  4 Sheets-Sheet 1

INVENTOR
EDWIN S. WOODHALL
ATTORNEY

Nov. 23, 1971  E. S. WOODHALL  3,621,522
POLYURETHANE FOAM APPARATUS
Filed June 16, 1969  4 Sheets-Sheet 4

INVENTOR.
EDWIN S. WOODHALL
BY
*J. D. Wolfe*
ATTORNEY

United States Patent Office 3,621,522
Patented Nov. 23, 1971

3,621,522
POLYURETHANE FOAM APPARATUS
Edwin S. Woodhall, Cuyahoga Falls, Ohio, assignor to The Goodyear Tire & Rubber Company, Akron, Ohio
Filed June 16, 1969, Ser. No. 833,424
Int. Cl. B29c 5/00
U.S. Cl. 18—4 P
3 Claims

ABSTRACT OF THE DISCLOSURE

This invention relates to an apparatus for pouring polyurethane foamable molded goods wherein at least one pouring head has moved over the molds of one row of one set of molds and then moved over to the second row to permit the second row of molds to be poured in the desired sequence.

---

This invention relates to an apparatus for pouring foam materials into molds and for performing this operation in a continuous method.

Heretofore, in making molded foamable objects such as crash pads, seat cushions and related articles, it has been necessary to move the molds under the pouring head and considerable hand labor has been required to move the molds and perform other operations associated with the molding of these materials.

It is an object of this invention to provide apparatus and a method of operating said apparatus to mold polyurethane foamable materials.

Figure 1:
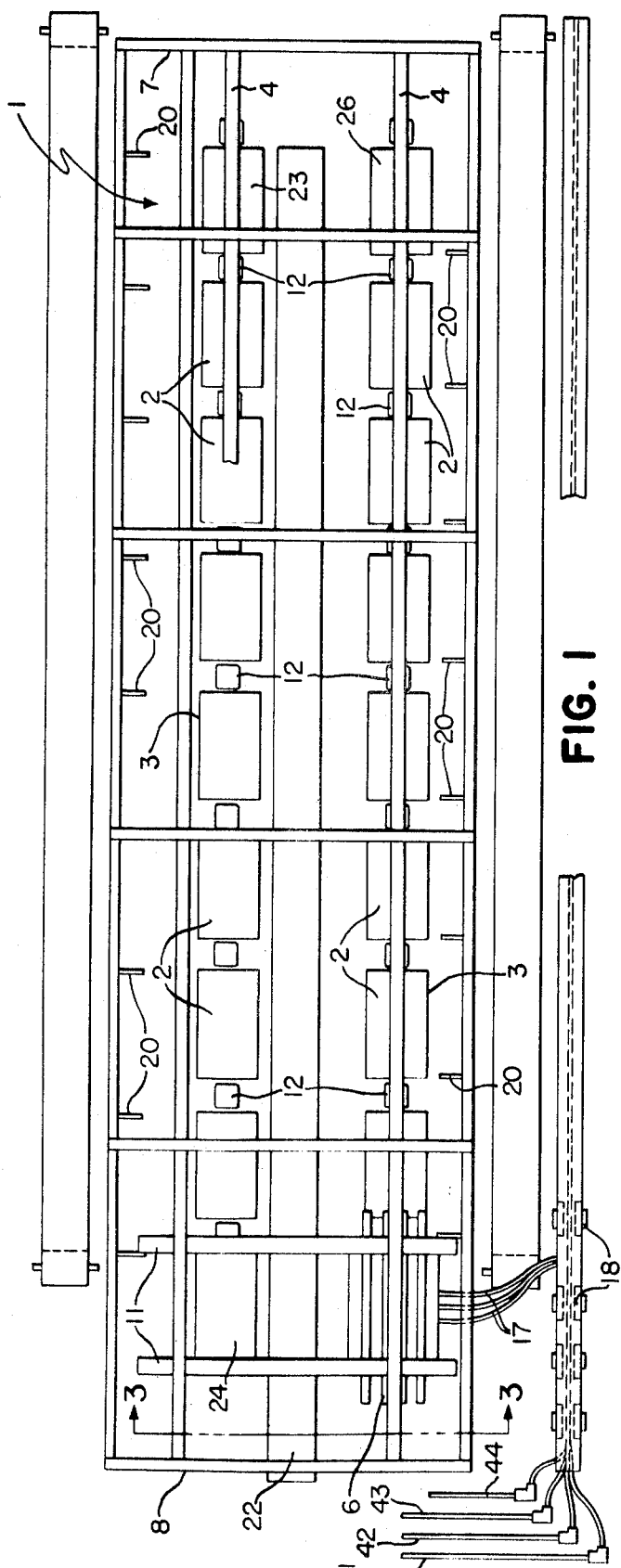
Figure 2:
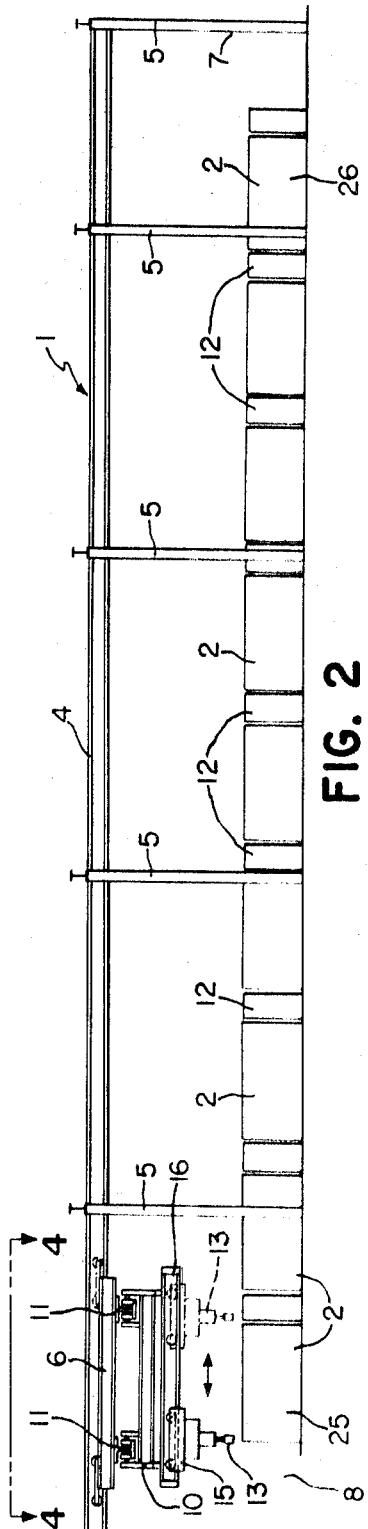
Figure 3:
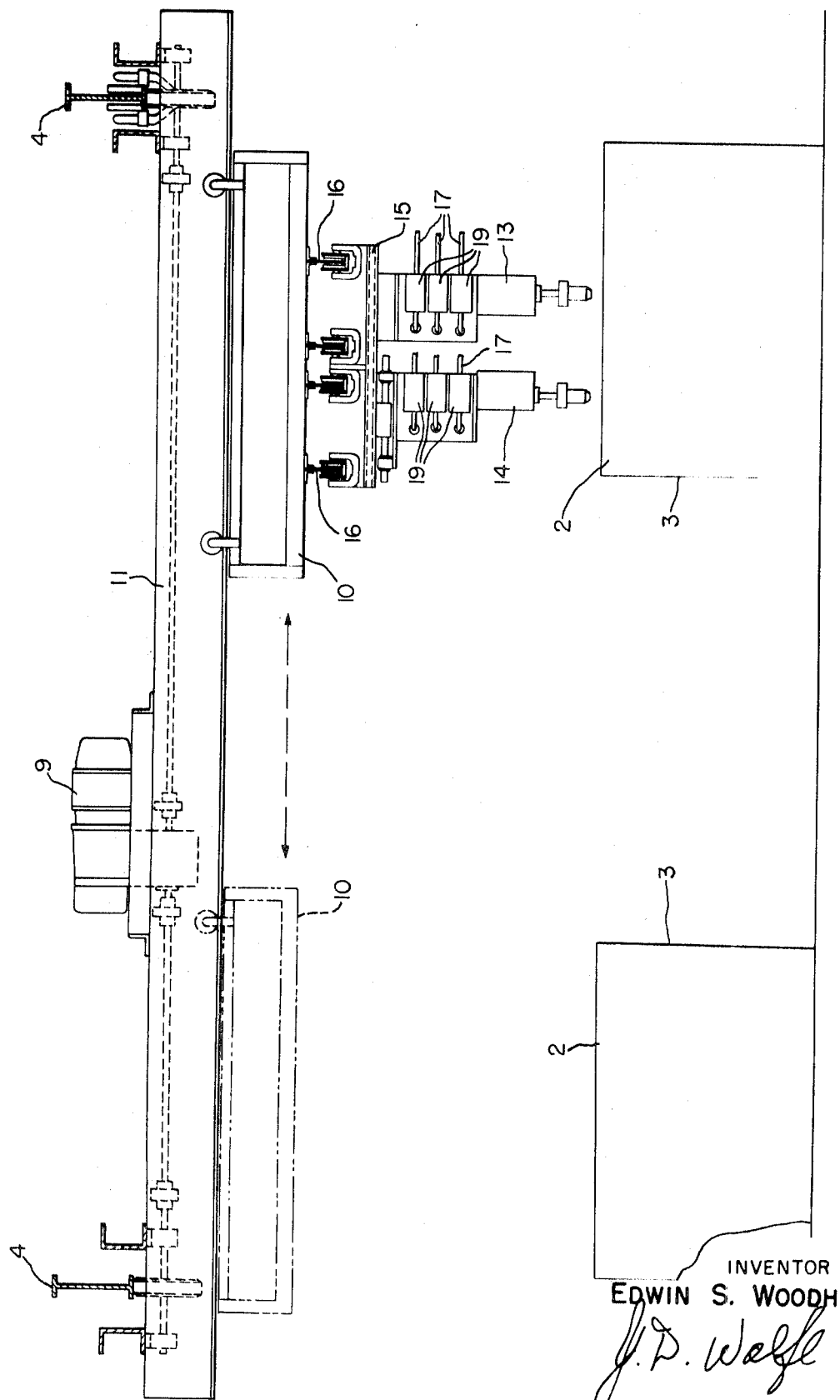
Figure 4:
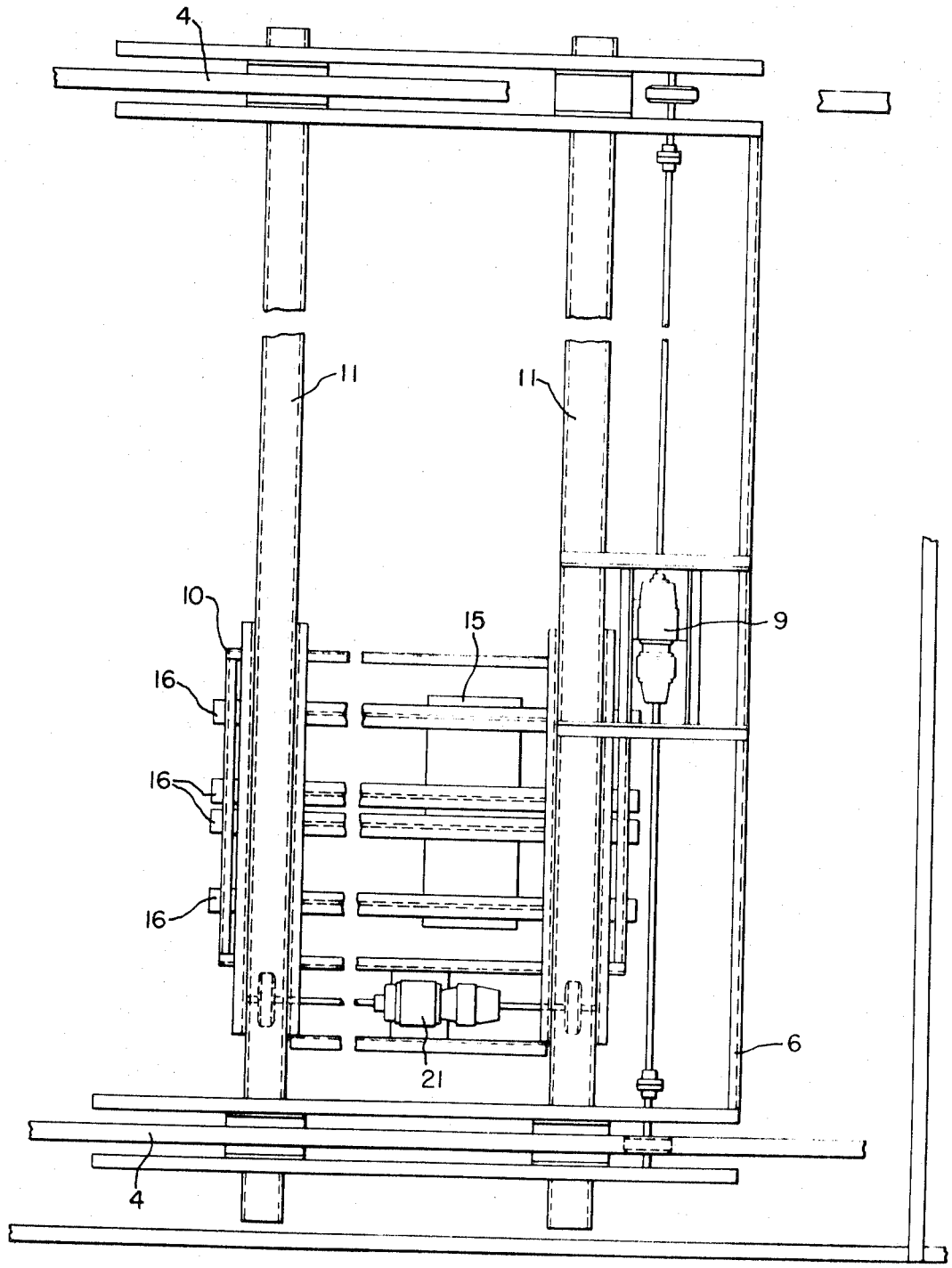
Figure 5:
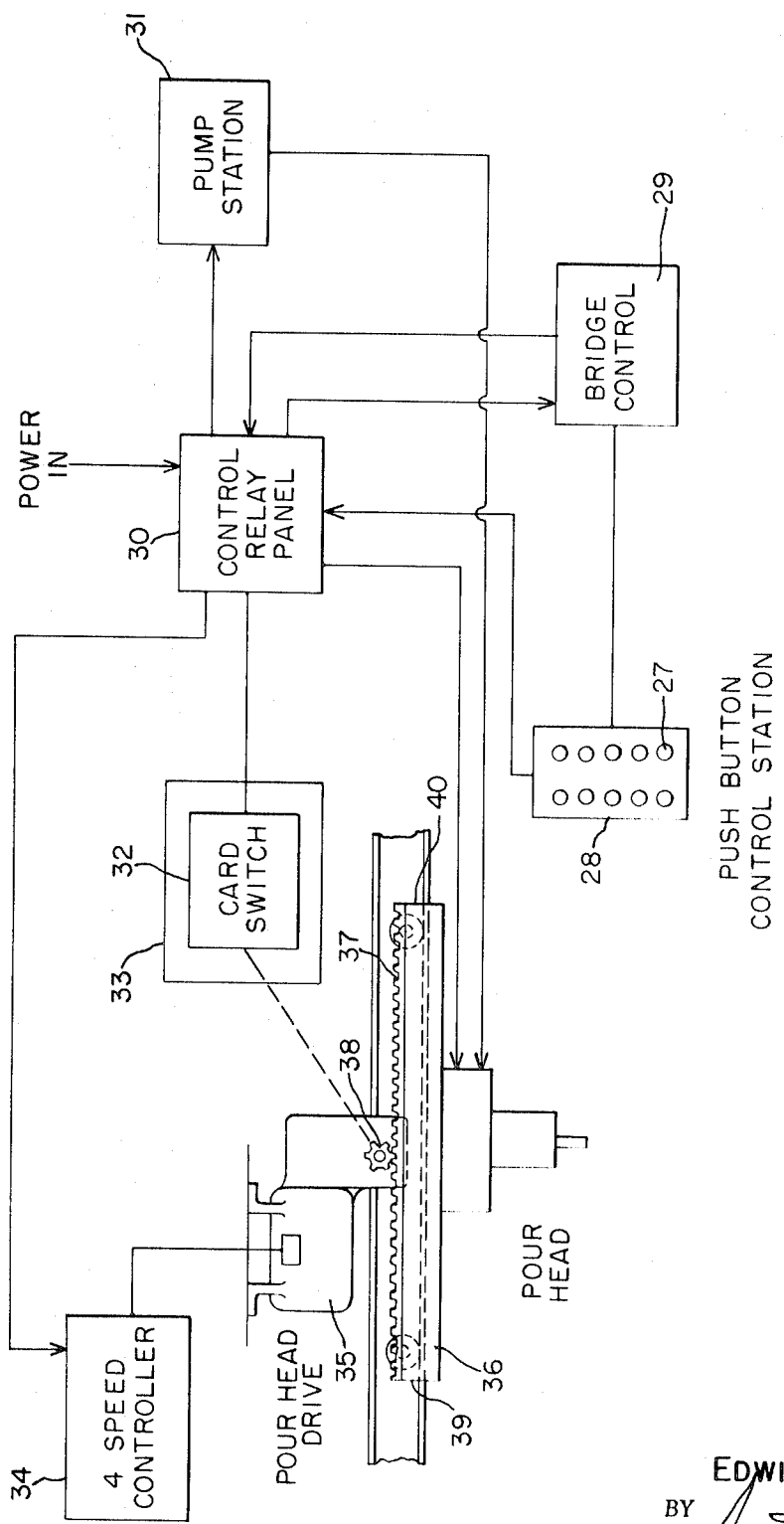

The above objects and other advantages of this invention may be more readily understood by reference to the drawings wherein FIG. 1 is a schematic plan view of a molding apparatus, FIG. 2 is a side elevation of said apparatus, FIG. 3 is an enlarged end view taken along line 3—3 of FIG. 1, FIG. 4 is an enlarged detail plan view taken along the line 4—4 of FIG. 2, and FIG. 5 is a schematic plan view of the electrical actuation circuits.

Referring to FIG. 1, numeral 1 indicates in general the molding apparatus having a set of molds 2 arranged essentially in two parallel spaced-apart rows 3 between a pair of tracks 4 which are supported above the molds by the track supports 5. The tracks have positioned thereon a bridge 6 which may be moved along the tracks 4 from the front end 7 to the rear end 8 in response to suitable activation of the motor 9, (shown in FIG. 4). Also the bridge 6 has suspended therefrom a trolley 10 which may move transversely along the tracks 11 associated with the bridge 6 to position the pouring means over either of the two rows of molds.

In FIG. 1 the molds are shown arranged in two parallel rows 3 with each mold being spaced apart in its row from the preceding mold. This permits a waste or cleaning container 12 to be positioned between each mold to receive the waste when either pouring head 13 or 14 is cleaned after each mold is poured. The nature of the pouring heads 13 or 14 may be more readily seen and understood by reference to FIGS. 2 and 3. Referring specifically to FIG. 2, it will be seen that the pouring heads 13 and 14 are suspended on a carriage 15 parallel with the bridge tracks 4 and the pouring heads are movable along the carriage tracks 16 as the bridge moves from one end to the other of the bridge tracks in response to suitable activation. Each of the pouring heads have connection by means of flexible hoses 17 resting primarily in flexible hose roll-up device 18 and connected to foaming ingredient supply tanks (not shown) which by suitable pressurizing means, i.e. pumps, maintain the feed of foaming ingredients to the pouring heads and by suitable operation of valves 19 associated with each ingredient feed line the ingredients are fed to the pouring head in the desired sequence to obtain the desired foamable mixture. The valves 19 on the pouring head are operated by a solenoid in response to suitable activation means such as a cam or micro switch activated by either manual means or the automatic controller to feed the foamable ingredients to the mixing head where they are mixed and allowed to flow by gravity or under a slight pressure into the mold beneath the pouring head. It should be appreciated that one pouring head may be moved back and forth across the mold while the foamable material is being poured into the mold from the other pouring head if so desired, or alternately, they can be operated simultaneously. On the other hand, one pouring head can be poured as it moves over the mold while the other is stopped over a mold opening and is pouring the desired amount of material in said opening.

As the bridge moves from one end of the apparatus to the other, the pouring head will move from one mold to the next successive mold to pour the foamable material in each of the molds in the first row of molds, if this is so desired. At this time the motor 21 is activated to move the trolley from over the first row to over the second row of molds and there the trolley is indexed to leave the pouring heads suspended above the molds of the second row. With the pouring head or heads resting above the molds of the second row, the motor 9 of the bridge is activated to move the bridge back to its original position at the end of the tracks within the desired time sequence as controlled either manually or by the automatic controller to permit each mold in the second row to receive its alloted amount of foamable mixture. When the bridge returns to its original position the motor 21 associated with the trolley is activated either by manually pressing a switch or the bridge contacting a switch arm 20 to move the carriage on the carriage tracks 16 from the second row back to their starting position to thereby position the pouring heads over the molds of the first row.

In the instance where the molds are to be used for pouring crash pads the pre-shaped crash pad skins such as the polyurethane or vinyl skin is brought by a skin conveyor system 22 into the molding apparatus located between the two rows of molds. The operator will remove one of the crash pad skins off the conveyor line and place it in a retaining mold and then when the pouring head is positioned over the mold the pouring head will be activated by a means (usually a manual switch) to cause valves 19 to open to permit the foaming ingredients to be fed to the pouring head and thus allow the mold to receive the desired amount of foamable mixture. Thus, the pouring apparatus receives a demand for a foamable mixture and the pouring head by the suitable cooperative action between the bridge and the trolley means moves the pouring head to a position above the mold, at which time the pouring head is activated and the mold receives the desired amount of foamable material. Then the cooperative action of the bridge and the trolley means moves the pouring head to the clean station between the mold which has just been poured and the next mold in the row. Here the pouring head is flushed with suitable cleaning solvent, usually a methyl ethyl ketone or methylene chloride to remove the waste from the pouring head and then the solvent is removed by a blast of warm air. As soon as the foamable material has been added to the mold and the pouring head has moved from over the mold the operator closes the mold or it can be closed by automatic means such as a hydraulic ram, and thus allow the foamable mixture to foam and fill the mold. In general, by the time the pouring head has moved from the initial mold 23 to the last mold 24 of the first row and over to the first mold 25 of the second row and back to the last mold 26 of the second row, the first mold 23 in the first row has foamed and the crash pad is cured and the operator has removed the finished crash pad from the mold by automatically opening the mold and removing the crash pad by hand with the aid of a jet of air where needed. Then the mold is cleaned and another skin placed in the mold to start another cycle.

The automatic operation of this pouring apparatus may be more readily appreciated by reference to FIG. 5. To start this apparatus the operator pushes the bridge control button 29 in the push button control station 28 to energize the bridge control circuit 29 and thus cause motor 9 to move the bridge from the front end 7 of the apparatus towards the rear 8. As the bridge moves forward in the direction indicated it will contact the limit switches 20 associated with each mold in the first row of molds and thus cause an electrical signal to be transmitted to the control relay panel 30 which in turn will activate relays controlling the pumps in the pump station 31 and also activate the card switch 32 associated within the Seco Electronics Drive (Model No. 860), 33. This also causes control relay panel to energize the 4-way speed control panel 34 which will activate the pouring head drive means 35 to move the pouring head along the carriage at the desired rate in cooperation with the movement of the card in the Seco Electric Drive associated with the card switch.

Thus, when the pouring heads have moved over the molds and completed their pouring cycle as dictated by the signal sent out by the card switch as it moves about ridges of the card, the pouring heads come to rest over the clean-out station immediately preceding the molds just poured, at which time a time relay in the control relay panel will cause the valves to be opened and closed in the proper sequence to permit the pouring head to receive sufficient cleaning solvent, for instance, methyl ethyl ketone to flush out the foaming ingredients, and then the valves to the pouring head will be reversed in the proper sequence to receive a blast of hot air to leave the pouring head in a clean and dry condition and ready to await the next signal from the card switch to pour the next mold.

At this point the card switch in cooperation with the card containing the desired program activates the bridge control 29 and causes the bridge to move forward until it contacts the next relay switch over the next succeeding mold, at which time the pouring sequence is repeated until the bridge comes to rest over the mold at the rear end 8 of the pouring apparatus. Thus, when the bridge contacts the switch 20a at the rear of the pouring apparatus, it in turn stops the bridge motor and activates the motor associated with the trolley to cause the trolley to move the pouring heads from over the molds of the first row to a position over the molds of the second row, at which time the trolley contacts the relay switch 20b and stops the trolley motor. Also, relay switch 20b sends a signal to the control panel 30 that the pouring heads are now at rest over the molds of the second row and are ready to begin a new pouring cycle.

This in turn activates the relays in the control relay panel which signals the 4-way speed controller 34 and the card switch associated with the second Seco Electronic Drive associated with the second row of molds. Thus, the activation of the 4-way speed controller and the card switch associated with the second row of molds again activates the pouring head to cause the pouring heads to move forward through the pouring cycle in response to the program preset in the card associated with the card switch. Thus, the pouring heads move successfully from the molds in the second row at the rear of the apparatus to the mold at the front of the apparatus where it contacts successive relay switches 20 until it comes to relay switch 20c, that causes the apparatus to come to rest to await the activation of the push button by the operator to move the trolley over into position over the first row of molds to begin a second cycle.

The nature of the electrical circuit and specifically the card switch program control used with this apparatus may be more readily understood by describing the card used with the Model 860 Seco Electronic Drive. This card in general is approximately 3 inches wide and about 20 inches long and is made of a relatively stiff but slightly flexible plastic material. It contains a rack gear along one longitudinal edge suitable for driving the card back and forth by the pinion gear associated with the motor of said driver. The card has 12 parallel rows or ridges extending from end to end of the card. The card is programmed by cutting away parts of the ridges at the desired position from the end of the card where an eighth of an inch of the card represents so many inches of movement, for instance, of the pouring head or the bridge. Thus, by proper removal of the raised ridges in the various rows it is possible to preprogram the card where the card switch will energize the appropriate circuits to drive the bridge, trolley and the pouring heads in the desired sequence and at the desired speed as the pouring head moves over and past each mold. Thus, it is possible to program the pouring heads to move at essentially a continuous speed across the mold or speed of the pouring head can vary to control the amount of foamable material deposited in the mold according to the size and depth of the cavity to be filled with foam.

Since two Seco Electronic Drives are used and thus there are two cards, one for each pouring head, it is possible to have one pouring head move across the mold at a predetermined rate and speed while the other pouring head remains motionless or remains fixed to permit the pouring head to pour the material into a relatively small opening in the mold and then after a certain time elapses the card will cause the pouring head to move rapidly forward to another pouring position to pour into a second opening in the mold in accordance with the needs and demands of the mold.

Referring specifically to FIG. 5, it will be noted that the carriage 36 has a rack gear 37 on its top and the pour head drive 35 has a pinion gear 38 resting in driving relationship with the rack gear 37. Thus, when the pour head drive is energized the electric motor associated with the pinion gear 38 moves the pouring head from the end 39 through successive intermediate positions to the end 40 of the carriage. Likewise, when the card switch reverses the energization of the motor, the pouring head is returned from end 40 through successive positions to end 39 of the carriage.

In a specific embodiment, the foamable ingredient storage tanks are filled with the desired foamable ingredients. Then on activation of the button for starting the pumps in the pump station 31 the foaming ingredient will be fed to the pouring head by the lines connecting the storage tanks with the pouring head. For instance, line 41 would be used to convey the reactive hydrogen containing material such as a polyester or polyether polyol of about 500 to 5000 molecular weight to the pouring head, line 42 would be used to convey the organic polyisocyanate, for instance, toluene diisocyanate, or one of the polymeric polyaryl polyisocyanates, and line 43 would be used to convey the auxiliary foaming ingredients such as water, blowing agents, catalysts, etc. to the pouring head or, alternately, line 44 could be used to convey the solvent for cleaning the pouring head.

Thus, by the proper manual or automatic energization of the circuit, it is possible to pour polyurethane foam into the molds resting on the floor beneath the foaming apparatus as the trolley and bridge move into position the pouring heads of the molds at the desired place.

Although we have exemplified this invention by the use of polyurethane foamable materials, those skilled in the art appreciate that other foamable materials well known to the foaming art may be utilized also. It should be appreciated that it is not essential to have a skin in the mold for this apparatus could be utilized to mold materials without a prefabricated skin such as the vinyl or polyurethane described heretofore. Those acquainted with the crash pad art appreciate that it is necessary in some instances to add in metal or plastic preformed components to get the desired configuration and attaching means for crash pads and related automobile accessories or furniture components.

While certain representative embodiments and details have been shown for the purpose of illustrating the invention, it will be apparent to those skilled in this art that various changes and modifications may be made therein without departing from the spirit or scope of the invention.

What is claimed is:

1. A foaming apparatus comprising a plurality of stationary molds arranged in a set to permit a bridge means to move on a track means transversely over said molds, said bridge means including a trolley means to move a plurality of foam pouring means relative to said bridge means from one side to the other side of the set of molds, said foam pouring means including at least one pouring head with its associated means for feeding foaming ingredients to a mixing means, a cleaning means positioned between each mold and means to move the pouring heads across the mold at a predetermined speed to said cleaning means.

2. In combination, a base member having a series of stationary molds arranged in a set thereon and having support members projecting upward therefrom to support a track, said track having a bridge supported thereon and movable back and forth over the molds, said bridge having a trolley means suspended from and movable transversely to the motion of the bridge, said trolley means supporting a carriage, including two foam pouring means thereon and allowing said foam pouring means to move back and forth in the direction of travel of the bridge without regard to the direction in which the bridge is traveling, said foam pouring means including at least one pouring head with its associated means for feeding foaming ingredients to a mixing means, a cleaning means positioned between each mold and said means to move the pouring heads across each mold at a predetermined speed to provide the desired fill pattern in the mold, and then allow the mixing means to be cleaned.

3. The foaming apparatus of claim 1 wherein said trolley means supports a carriage and has two foam pouring means which move back and forth in the direction of travel of the bridge without regard to the direction in which the bridge is traveling to fill each mold.

References Cited
UNITED STATES PATENTS

| | | | |
|---|---|---|---|
| 3,032,851 | 5/1962 | Gibbs | 25—2 |
| 3,197,531 | 7/1965 | Wilbur, Jr. | 18—5 PX |
| 3,247,295 | 4/1966 | Bunwell | 18—4 PX |
| 3,268,642 | 8/1966 | Hutter | 18—4 PX |

ROBERT L. SPICER, Jr., Primary Examiner

U.S. Cl. X.R.

25—2